United States Patent [19]

Gauthier

[11] 4,230,618
[45] Oct. 28, 1980

[54] AZO DYESTUFFS CONTAINING AN AMINO OR ACYLATED AMINO NAPHTHOL DI-SULFONIC ACID RADICAL AND AT LEAST ONE REACTIVE PHOSPHORIC OR PHOSPHONIC ACID GROUP

[75] Inventor: Donald R. Gauthier, Somerset, Mass.

[73] Assignee: ICI United States, Inc., Wilmington, Del.

[21] Appl. No.: 837,625

[22] Filed: Sep. 27, 1977

[51] Int. Cl.$^2$ .................. C09B 62/82; D06P 1/384; D06P 3/66

[52] U.S. Cl. .................. 260/187; 260/188; 260/190; 260/191; 260/194; 260/198; 260/199; 260/205; 260/206; 260/208

[58] Field of Search .............. 260/187, 191, 190, 194, 260/198, 199, 188

[56] References Cited

U.S. PATENT DOCUMENTS 3,947,435  3/1976  Pechmeze et al. .................. 260/190

FOREIGN PATENT DOCUMENTS 2324809 12/1973 Fed. Rep. of Germany .......... 260/191
2618670 11/1976 Fed. Rep. of Germany .......... 260/191

*Primary Examiner*—Floyd D. Higel
*Attorney, Agent, or Firm*—Cushman, Darby & Cushman

[57] ABSTRACT

Azo dyestuffs of the formula:

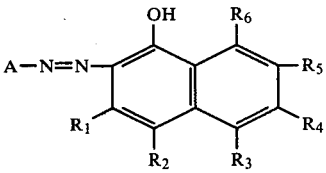

wherein A is a phenylene or naphthalene nucleus containing at least one phosphoric or phosphonic acid group; $R_1$ and $R_2$ are hydrogen or —$SO_3H$; and $R_3$–$R_6$ are hydrogen, —$SO_3H$, or $NR_7Q$ wherein $R_7$ is hydrogen or lower alkyl and Q is hydrogen or an acyl group of 2 to 8 carbon atoms, at least two of $R_1$–$R_6$ being —$SO_3H$ and at least one being —NHQ, provided that when the dyestuff is monoazo, then Q is an acyl group of 3 to 8 carbons and when the dyestuff is disazo, Q is hydrogen or an acyl group of 2 to 8 carbon atoms. The dyestuff may be used to reactively dye cellulosic materials, e.g., cotton or cotton/polyester blends. The dyestuffs are particularly useful in dyeing mixed fabrics of cellulose and synthetics together with disperse dyes from a single bath.

13 Claims, No Drawings

AZO DYESTUFFS CONTAINING AN AMINO OR ACYLATED AMINO NAPHTHOL DI-SULFONIC ACID RADICAL AND AT LEAST ONE REACTIVE PHOSPHORIC OR PHOSPHONIC ACID GROUP

BACKGROUND OF THE INVENTION

This invention relates to dyestuffs which contain an amino or acylated amino naphthol di-sulfonic acid radical and at least one phosphoric or phosphonic acid group and which are suitable for reactively dyeing cellulosic materials, e.g., cotton and cotton/polyester blends.

A process for reactively dyeing a hydroxy-substituted organic polymer, such as cellulose, is described by Stanford Research Institute in German Pat. No. 2,324,809, published Dec. 20, 1973. The process so described involves treating the cellulosic material with a dye containing a phosphonic acid group in the presence of a carbodiimide, e.g., dicyandiamide, in such a way that the dye is fixed to the cellulose in the form of a cellulose ester of phosphonic acid. The process can be illustrated by the following reaction:

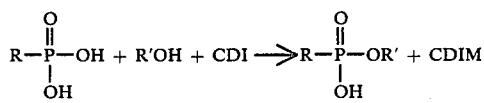

wherein R is a chromophore group, R'OH represents cellulose, CDI is the carbodiimide and CDIM is a residue or side product of carbodiimide. A similar mechanism applies for dyestuffs containing phosphoric acid groups. Cellulose materials so dyed exhibit good color stability when subsequently treated with alkaline detergents.

It is a primary object of the present invention to provide new fiber reactive dyestuffs which are especially suitable for coloring cellulose-based textile materials in the manner described in the above-mentioned German patent.

Still another object of this invention is to provide dyestuffs which may be employed in acid, neutral or alkaline baths to color cellulose materials.

These and other objects of the present invention will be apparent from the following description.

DESCRIPTION OF THE INVENTION

The azo dyestuffs of the invention may be illustrated by the formula:

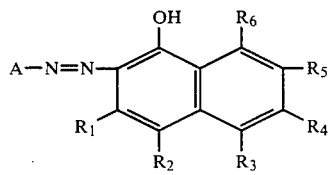

wherein A is a phenylene or naphthalene nucleus containing at least one phosphoric or phosphonic acid group; $R_1$ and $R_2$ are hydrogen or —$SO_3H$; and $R_3$–$R_6$ are hydrogen, —$SO_3H$, or $NR_7Q$ wherein $R_7$ is hydrogen or lower alkyl and Q is hydrogen or an acyl group of 2 to 8 carbon atoms, at least two of $R_{1-6}$ being —$SO_3H$ and at least one being —N—Q, provided that when the dyestuff is monazo, then Q is an acyl group of 3 to 8 carbons and when the dyestuff is disazo, Q is hydrogen or an acyl group of 2 to 8 carbon atoms.

Preferably, A is a phenyl or naphthyl group which, apart from the phosphoric or phosphonic acid group or groups, is either unsubstituted or substituted with, for example, one or more halogen, alkyl, alkoxy, nitro, cyano, acetylamino, sulfonic acid or carboxylic acid groups. Typical halogen values include chlorine and bromine while the alkyl and alkoxy substituents will usually contain up to 6 carbon atoms, although longer chain lengths may also be used.

It is also contemplated that the dyestuffs of the present invention include those wherein A stands for a radical of azo benzene, azonaphthalene or phenylazonaphthalene series which, if desired, may be substituted as noted.

The dyestuffs of the invention may be prepared using conventional methods for preparing azo dyestuffs involving the preparation of a diazonium salt from a primary amine followed by coupling. See, for example, Vogel "Practical Organic Chemistry" (1951) or German Pat. No. 2,324,809. Thus, an aromatic primary amine containing at least one phosphoric or phosphonic acid group may be converted into its diazonium salt followed by coupling the diazonium salt with an acylated amino naphthol mono-sulfonic acid which has a removable hydrogen attached to a carbon atom of the naphthalene ring. The diazonium salt of the aromatic primary amine may be prepared in any known way, e.g., by reacting the parent amine with sodium nitrite in the presence of HCL at low temperatures (such as 0°-15° C.). Coupling of this salt can be carried out by, for example, mixing an aqueous solution of the salt with the naphthol disulfonic acid component at 0°-15° C. The resulting dyestuff can be recovered by precipitating the same and filtering or by using other conventional separation techniques.

The new dyes can be isolated as solid products by conventional means such as spray-drying or by precipitation and filtration. They are preferably isolated in the acid form or in the form of an ammonium salt or partly in one of these forms and partly as an alkali metal, e.g. Li, Na or K salt. These salts can be obtained by adding a halide e.g. the chloride of the desired alkali metal or ammonium halide or ammonia to the completed reaction mixture before isolation. Alternatively by addition of an alkanolamine e.g. diethanolamine to the completed reaction mixture, a highly soluble form of the dyestuff is obtained which can be used as a total liquor for the dyeing in printing process.

Aromatic primary amines containing a phosphonic acid group which may be converted to diazonium salts for use in preparing the dyestuffs of the invention may be described by the following formula:

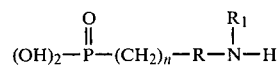

wherein:
R is a phenyl or naphthyl radical, unsubstituted or substituted:
$R_1$ is hydrogen or alkyl of 1 to 4 carbon atoms; and
n is 0 or an integer of 1 to 4, but preferably 0.

If substituted, the phenyl or naphthyl radical may contain at least one halogen (e.g. bromine or chlorine) nitro, alkyl of 1 to 4 carbon atoms, alkoxy of 1 to 4 carbon atoms, or phenoxy substituent.

Typical examples of phosphonic acid amines which can be diazotized for use herein include the following:
meta-aminophenyl phosphonic acid;
para-aminophenyl phosphonic acid;
meta-aminobenzyl phosphonic acid;
para-aminobenzyl phosphonic acid;
2,4,6-tribromo-4-aminophenyl phosphonic acid;
3-nitro-4-aminophenyl phosphonic acid;
3-amino-4-chlorophenyl phosphonic acid;
3-amino-4-methylphenyl phosphonic acid;
3-amino-4-phenoxyphenyl phosphonic acid;
3-amino-4-hydroxyphenyl phosphonic acid;
3-amino-4-orthochlorophenoxyphenyl phosphonic acid;
3-amino-4-bromophenyl phosphonic acid;
3-amino-4-bromophenyl phosphonic acid;
3-amino-4-methoxyphenyl phosphonic acid;
3-amino-4-methylphenyl phosphonic acid;
2-hydroxy-5-aminobenzyl phosphonic acid;
4-amino-1-naphthyl phosphonic acid;
4-amino-8-methyl-1-naphthyl phosphonic acid; and
4-amino-3-chloro-1-naphthyl phosphonic acid.

Aromatic primary amines containing a phosphoric acid group which may be converted to diazonium salts for use in preparing the dyestuffs of the invention may be described by the following formula:

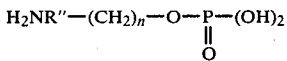

wherein:
R" is a phenyl or naphthyl radical, unsubstituted or substituted; and
n is 0 or a whole number from 1 to 4, but preferably 0.

When substituted the phenyl or naphthyl radical may contain one or more halogen (e.g. bromine or chlorine), nitro, alkyl of 1 to 4 carbon atoms, alkoxy of 1 to 4 carbon atoms or phenoxy substituents.

Typical examples of phosphoric acid amines which can be diazotized for use herein include the following:
meta-aminophenyl phosphoric acid;
para-aminophenyl phosphoric acid;
meta-aminobenzyl phosphoric acid;
para-aminobenzyl phosphoric acid;
2,4,6-tribromo-4-aminophenyl phosphoric acid;
3-nitro-4-aminophenyl phosphoric acid;
3-amino-4-chlorophenyl phosphoric acid;
3-amino-4-methylphenyl phosphoric acid;
3-amino-4-phenoxyphenyl phosphoric acid;
3-amino-4-hydroxyphenyl phosphoric acid;
3-amino-4-orthochlorophenoxyphenyl phosphoric acid;
3-amino-4-bromophenyl phosphoric acid;
3-amino-4-methoxyphenyl phosphoric acid;
3-amino-4-methylphenyl phosphoric acid;
2-hydroxy-5-aminobenzyl phosphoric acid;
4-amino-1-naphthyl phosphoric acid;
4-amino-8-methyl-1-naphthyl phosphoric acid; and
4-amino-3-chloro-1-naphthyl phosphoric acid.

In a most preferred embodiment, A may be represented by the formulae:

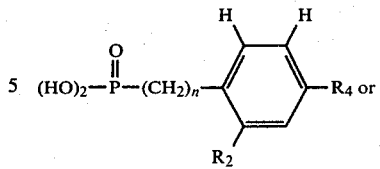

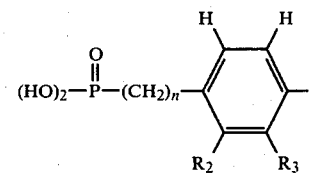

wherein:
n is 0 or an integer from 1 to 4;
$R_2$ is hydrogen or halogen;
$R_3$ is hydrogen or nitro; and
$R_4$ is hydrogen, halogen, lower alkyl of 1 to 4 carbons, methoxy, phenoxy or R'—NH— where R' is alkyl of 1 to 4 carbon atoms, hydroxy alkyl of 1 to 4 carbon atoms having a terminal sulfonic acid group; provided further that A is coupled to the naphthalene coupling component by a diazo linkage at $R_3$ or $R_4$.

If desired, any of the above amines may be coupled with such amines as p-xylidine, Peri acid, cresidine at a pH of about 3 to 5. Also, one may use either aniline or meta-toluidine by way of the methane sulfonic acids. The resulting amino-monazo compounds may then be diazotized and coupled with the desired coupling component. Thus, suitable amino-monazo compounds include:

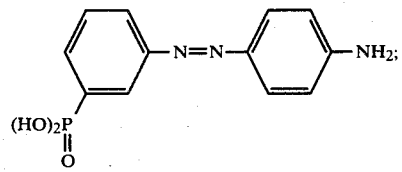

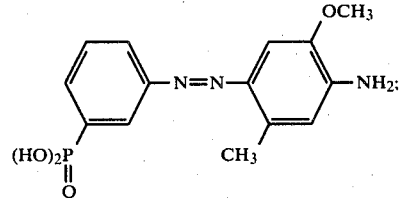

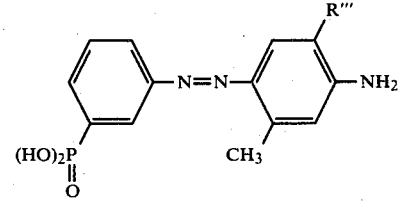

where R''' is hydrogen or methyl;

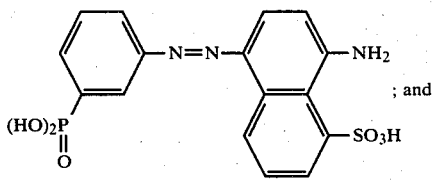

; and

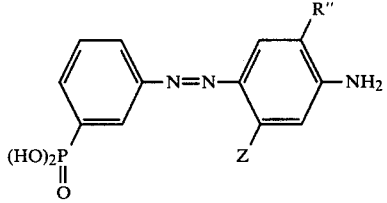

where Z = H or CH₃
R″ = OCH₃, CH₃ or H.

Typically, the naphthol component used to make the present dyestuffs is one of the following:
8-amino-1-naphthol-3,6-disulfonic acid (H-acid);
8-amino-1-naphthol-5,7-disulfonic acid (Chicago acid);
6-amino-1-naphthol-3,8-disulfonic acid (1-sulfo-J-acid);
8-amino-1-naphthol-3,5-disulfonic acid;
8-amino-1-naphthol-4,6-disulfonic acid (B-acid);
6-amino-1-naphthol-3,5-disulfonic acid;
1-amino-6-naphthol-3,8-disulfonic acid; and
7-amino-1-naphthol-3,6-disulfonic acid,
wherein the amino group has been acylated to —NHQ wherein Q contains 2 to 8 carbon atoms, and is preferably an alkyl group containing 2 to 4 carbons or an aryl group, e.g.

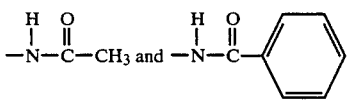

The lower alkyl amino counterparts of the naphthols referred to above may also be used to give acylated derivatives wherein the amino hydrogen in —NHQ is replaced by lower alkyl.

The new dyestuffs are soluble in water owing to the presence of phosphoric or phosphonic acid groups. In many cases, there may also be sulfonic acid groups present to increase their solubility. They can be used, in general, for the coloration of textile materials which can be dyed by dyes solubilized by anionic groups, e.g., natural and synthetic polyamide materials, e.g., wool, silk, polyhexamethylene adipamide and polycaproimide, but more especially, natural or regenerated cellulose textile materials, e.g., cotton, linen and viscose rayon; in the case of cellulose textile materials, they are preferably fixed on the fiber by baking at a temperature of from 95°–205° C. in the presence of a carbodiimide, e.g., cyanamide, dicyandiamide, as described in German Pat. No. 2,324,809.

The new dyestuffs are particularly suitable for application to mixed fabrics of cellulose and synthetics, e.g., polyester materials, together with disperse dyes from a single dyebath or printing paste. In this respect, the new dyestuffs show an advantage over most conventional reactive dyes which are normally applied in the presence of alkaline fixing agents. The latter lead to flocculation of the majority of disperse dyes, so that the range of the latter which can be applied together with conventional reactive dyes in single dyebaths or printing pastes is very limited. In contrast, the acid fixing conditions used for the new dyes have no effect on disperse dyes, and the two classes of dyes can be used together without difficulty.

The invention is illustrated but not limited by the following examples wherein parts are by weight unless otherwise stated.

EXAMPLE 1

An aqueous solution of the diazonium salt of meta-phosphanilic acid and 1-amino-8-naphthol-2,4-disulfonic acid (Chicago acid) was maintained at a pH of about 7 to 8, and a temperature of 0°–5° C. for coupling. Upon completion of the coupling reaction, the solution was heated to 50° C. and then salted 10% w/v of ammonium chloride. The solution was then cooled to 20° C. and filtered. A reactive red disazo dyestuff was obtained in 70.5% yield having the formula:

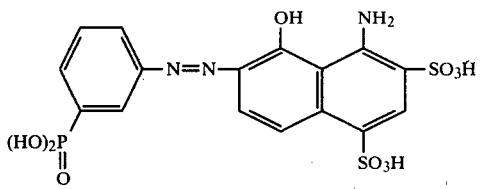

EXAMPLE 2

3-aminobenzene phosphonic acid was coupled with cresidine and the resulting monazo amine treated to form the diazonium salt. The resulting diazonium salt was then coupled with Chicago acid at a pH of 7–8, and a temperature of 0°–5° C. After salting the coupling mixture 30% w/v ammonium chloride, no precipitate was observed. Acidification with hydrochloric acid to a pH of 1.5 produced only a slight precipitate. The product was isolated by the addition of 1 liter of ethanol and filtering at 10° C. The product yield was 70.3% of theory of a reactive blue dyestuff having the formula:

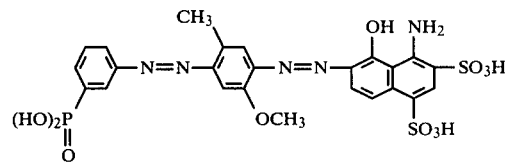

EXAMPLE 3

The diazonium salt of the product resulting from the coupling of 3-aminobenzene phosphonic acid and cresidine was coupled with acetyl-H-acid in an aqueous solution having a pH of 7–8 and a temperature of 0°–5° C. The coupling mixture was salted with ammonium chloride 10% w/v and isolated at a temperature of 10° C. The mixture was filtered and 94.2% yield of theory of a reactive violet diazo dyestuff was obtained having the formula:

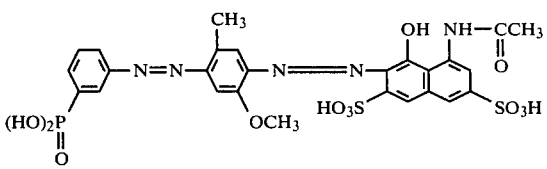

EXAMPLE 4

Para-xylidine was coupled with 3-aminobenzene phosphonic acid and the resulting monazo amine reacted to form the diazonium salt which was then coupled with acetyl-H-acid. Coupling was carried out at a pH of 7–8 and a temperature of 0°–5° C., after which the product was salted with 10% w/v ammonium chloride. The product was filtered at 5° C., yielding 70.7% yield of theory of a reactive red dyestuff having the formula:

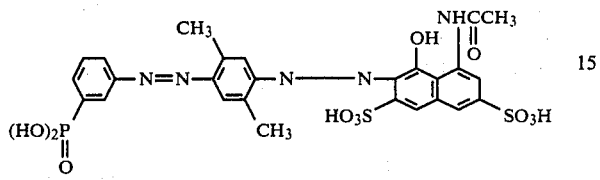

EXAMPLE 5

By omitting the addition of ammonium chloride in the procedure of Example 1 and replacing it by step of adding hydrochloric acid until the pH of the reaction is 0.5 the dyestuffs described in any of the preceding Examples may be obtained in their free acid form.

EXAMPLE 6

By omitting the addition of ammonium chloride in the procedure of Example 4 and including the step of adding hydrochloric acid and heating to 50°–70° C., the dyestuff of Example 4 may be isolated in its free acid deacylated form. If desired, the deacylated free acid may be converted to the ammonium salt by dissolving with ammonia to pH 7–8, followed by salting out with ammonium chloride and filtration.

EXAMPLES 7–51

Monazo dyestuffs are prepared by diazotizing an aromatic phosphonic or phosphoric acid amine (I) and coupling at 0°–5° C. and pH 6–8 into an aminonaphthol disulfonic acid (II) previously N-acylated with an acyl anhydride or halide (III) as outlined in Table A below.

TABLE A

| EXAMPLE | I | II | III | COLOR |
|---|---|---|---|---|
| 7 | 3-Aminophenyl-phosphonic acid | 1-Amino-8-naphthol-3,6-disulfonic acid | Propionic anhydride | Red |
| 8 | 3-Aminophenyl-phosphonic acid | 1-Amino-8-naphthol-3,6-disulfonic acid | Butyric anhydride | " |
| 9 | 4-Aminophenyl-phosphonic acid | 1-Amino-8-naphthol-3,6-disulfonic acid | Propionic anhydride | " |
| 10 | 4-Aminobenzyl-phosphonic acid | 1-Amino-8-naphthol-3,6-disulfonic acid | " | " |
| 11 | 3-Amino-4-methylphenyl-2-phosphonic acid | 1-Amino-8-naphthol-3,6-disulfonic acid | " | " |
| 12 | 3-Aminophenyl-phosphonic acid | 8-Amino-1-naphthol-3,5-disulfonic acid | " | " |
| 13 | 3-Aminophenyl-phosphonic acid | 8-Amino-1-naphthol-3,5-disulfonic acid | Butyric anhydride | " |
| 14 | 4-Aminophenyl-phosphonic acid | 8-Amino-1-naphthol-3,5-disulfonic acid | Propionic anhydride | " |
| 15 | 4-Aminobenzyl-phosphonic acid | 8-Amino-1-naphthol-3,5-disulfonic acid | " | " |
| 16 | 4-Aminophenyl-phosphonic acid | 8-Amino-1-naphthol-3,5-disulfonic acid | " | " |
| 17 | 3-Aminophenyl-phosphonic acid | 7-Amino-1-naphthol-3,6-disulfonic acid | " | Orange-Red |
| 18 | 3-Aminophenyl-phosphonic acid | 7-Amino-1-naphthol-3,6-disulfonic acid | Butyric anhydride | Red |
| 19 | 4-Aminobenzyl-phosphonic acid | 7-Amino-1-naphthol-3,6-disulfonic acid | Propionic anhydride | " |
| 20 | 4-Aminophenyl-phosphonic acid | 7-Amino-1-naphthol-3,6-disulfonic acid | " | " |
| 21 | 4-Aminophenyl-phosphonic acid | 7-Amino-1-naphthol-3,6-disulfonic acid | Butyric anhydride | " |
| 22 | 3-Aminophenyl-phosphonic acid | 1-Amino-6-naphthol-3,8-disulfonic acid | Propionic anhydride | " |
| 23 | 3-Aminophenyl-phosphonic acid | 1-Amino-6-naphthol-3,8-disulfonic acid | Butyric anhydride | " |
| 24 | 4-Aminophenyl-phosphonic acid | 1-Amino-6-naphthol-3,8-disulfonic acid | " | " |
| 25 | 4-Aminophenyl-phosphonic acid | 1-Amino-6-naphthol-3,8-disulfonic acid | Propionic anhydride | " |
| 26 | 4-Aminobenzyl-phosphonic acid | 1-Amino-6-naphthol-3,8-disulfonic acid | " | " |
| 27 | 3-Aminophenyl-phosphonic acid | 8-Amino-1-naphthol-4,6-disulfonic acid | " | " |
| 28 | 3-Aminophenyl-phosphonic acid | 8-Amino-1-naphthol-4,6-disulfonic acid | Butyric anhydride | " |
| 29 | 4-Aminophenyl-phosphonic acid | 8-Amino-1-naphthol-4,6-disulfonic acid | " | " |
| 30 | 4-Aminophenyl-phosphonic acid | 8-Amino-1-naphthol-4,6-disulfonic acid | Propionic anhydride | " |
| 31 | 4-Aminobenzyl-phosphonic acid | 8-Amino-1-naphthol-4,6-disulfonic acid | " | " |
| 32 | 3-Amino-4-methylphenyl-2- | 8-Amino-1-naphthol-4,6- | " | " |

TABLE A-continued

| EXAMPLE | I | II | III | COLOR |
|---|---|---|---|---|
|  | phosphonic acid | disulfonic acid |  |  |
| 33 | 3-Aminophenyl-phosphonic acid | 6-Amino-1-naphthol-3,8-disulfonic acid | " | Orange |
| 34 | 3-Aminophenyl-phosphonic acid | 6-Amino-1-naphthol-3,8-disulfonic acid | Butyric anhydride | " |
| 35 | 4-Aminophenyl-phosphonic acid | 6-Amino-1-naphthol-3,8-disulfonic acid | " | " |
| 36 | 4-Aminophenyl-phosphonic acid | 6-Amino-1-naphthol-3,8-disulfonic acid | Propionic anhydride | " |
| 37 | 4-Aminobenzyl-phosphonic acid | 6-Amino-1-naphthol-3,8-disulfonic acid | " | " |
| 38 | 3-Amino-4-methylphenyl-2-phosphonic acid | 6-Amino-1-naphthol-3,8-disulfonic acid | " | " |
| 39 | 4-Aminophenyl-phosphonic acid | 1-Amino-8-naphthol-2,4-disulfonic acid | " | Red |
| 40 | 4-Aminophenyl-phosphonic acid | 1-Amino-8-naphthol-2,4-disulfonic acid | Butyric anhydride | " |
| 41 | 3-Aminophenyl-phosphonic acid | 1-Amino-8-naphthol-2,4-disulfonic acid | Propionic anhydride | " |
| 42 | 3-Aminophenyl-phosphonic acid | 1-Amino-8-naphthol-2,4-disulfonic acid | Butyric anhydride | " |
| 43 | 4-Aminobenzyl-phosphonic acid | 1-Amino-8-naphthol-2,4-disulfonic acid | " | " |
| 44 | 4-Aminobenzyl-phosphonic acid | 1-Amino-8-naphthol-2,4-disulfonic acid | Propionic anhydride | " |
| 45 | 3-Aminophenyl-phosphonic acid | 6-Amino-1-naphthol-3,5-disulfonic acid | " | " |
| 46 | 3-Aminophenyl-phosphonic acid | 6-Amino-1-naphthol-3,5-disulfonic acid | Butyric anhydride | " |
| 47 | 4-Aminobenzyl-phosphonic acid | 6-Amino-1-naphthol-3,5-disulfonic acid | " | " |
| 48 | 4-Aminobenzyl-phosphonic acid | 6-Amino-1-naphthol-3,5-disulfonic acid | Propionic anhydride | " |
| 49 | 4-Aminophenyl-phosphonic acid | 6-Amino-1-naphthol-3,5-disulfonic acid | " | " |
| 50 | 4-Aminophenyl-phosphonic acid | 6-Amino-1-naphthol-3,5-disulfonic acid | Butyric anhydride | " |
| 51 | 3-Amino-4-methylphenyl-2-phosphonic acid | 6-Amino-1-naphthol-3,5-disulfonic acid | " | " |

The dyestuffs of examples 7–51 may be converted to and isolated as the deacylated free acids by heating with hydrochloric acid to pH 0.5–2.0 at 50°–70° C. after coupling is complete, followed by cooling to 10°–20° C. and filtering. If desired, the ammonium salts of the deacylated dyestuffs may be obtained by neutralizing the hydrolyzed coupling mass to pH 7–8 with ammonia, followed by salting with ammonium chloride and filtering.

EXAMPLES 52–130

Acylated Disazo dyestuffs as in Example 4 may be prepared by diazotizing an aromatic phosphonic acid amine (I) and coupling into aromatic amines (IV) capable of undergoing coupling at 0°–10° C. and pH 4–5 such as p-xylidine, cresidine and Peri acid or aniline via the omega methane sulfonic acid as outlined in Table B below. The resulting Monazo compound may be isolated by salting or used directly as a diazo component by diazotization at 0°–20° C. and coupling at pH 6–9 into an aminonaphthol disulfonic acid (II) previously N-acylated with an acyl anhydride (III). The dyestuffs may be isolated by salting with ammonium chloride at 0°–20° C. and filtering.

TABLE B

| EXAMPLE | I | IV | II | III | COLOR |
|---|---|---|---|---|---|
| 52 | 3-Aminophenyl-phosphonic acid | Cresidine | 1-Amino-8-naphthol-3,6-disulfonic acid | Propionic Anhydride | Bluish-Red |
| 53 | 3-Aminophenyl-phosphonic acid | m-Toluidine | 1-Amino-8-naphthol-3,6-disulfonic acid | Acetic anhydride | Red |
| 54 | 3-Aminophenyl-phosphonic acid | Peri Acid | 1-Amino-8-naphthol-3,6-disulfonic acid | " | Blue |
| 55 | 3-Aminophenyl-phosphonic acid | 1,7-Cleaves Acid | 1-Amino-8-naphthol-3,6-disulfonic acid | " | " |
| 56 | 3-Aminophenyl-phosphonic acid | o-Anisidine | 1-Amino-8-naphthol-3,6-disulfonic acid | " | Red |
| 57 | 3-Aminophenyl-phosphonic acid | p-Xylidine | 1-Amino-8-naphthol-3,6-disulfonic acid | " | " |
| 58 | 4-Aminobenzyl-phosphonic acid | " | 1-Amino-8-naphthol-3,6-disulfonic acid | " | " |
| 59 | 3-Aminophenyl-phosphonic acid | m-Toluidine | 6-Amino-1-naphthol-3,8-disulfonic acid | " | " |
| 60 | 3-Aminophenyl-phosphonic acid | " | 6-Amino-1-naphthol-3,8-disulfonic acid | Propionic anhydride | " |
| 61 | 3-Aminophenyl-phosphonic acid | Cresidine | 6-Amino-1-naphthol-3,8-disulfonic acid | Acetic Anhydride | " |
| 62 | 3-Aminophenyl- | Peri acid | 6-Amino-1-naphthol- | " | Violet |

TABLE B-continued

| EXAMPLE | I | IV | II | III | COLOR |
|---|---|---|---|---|---|
| | phosphonic acid | | 3,8-disulfonic acid | | |
| 63 | 3-Aminophenyl-phosphonic acid | 1,6-Cleaves Acid | 6-Amino-1-naphthol-3,8-disulfonic acid | " | " |
| 64 | 3-Aminophenyl-phosphonic acid | o-Anisidine | 6-Amino-1-naphthol-3,8-disulfonic acid | " | Red Violet |
| 65 | 4-Aminophenyl-phosphonic acid | Peri acid | 6-Amino-1-naphthol-3,8-disulfonic acid | " | Violet |
| 66 | 4-Aminophenyl-phosphonic acid | 1,6-Cleaves Acid | 6-Amino-1-naphthol-3,8-disulfonic acid | " | " |
| 67 | 4-Aminophenyl-phosphonic acid | p-Xylidine | 6-Amino-1-naphthol-3,8-disulfonic acid | " | Red Violet |
| 68 | 4-Aminophenyl-phosphonic acid | o-Toluidine | 6-Amino-1-naphthol-3,8-disulfonic acid | " | Red |
| 69 | 4-Aminobenzyl-phosphonic acid | " | 6-Amino-1-naphthol-3,8-disulfonic acid | " | " |
| 70 | 4-Aminobenzyl-phosphonic acid | Peri Acid | 6-Amino-1-naphthol-3,8-disulfonic acid | " | Violet |
| 71 | 4-Aminobenzyl-phosphonic acid | 1,6-Cleaves acid | 6-Amino-1-naphthol-3,8-disulfonic acid | " | " |
| 72 | 4-Aminobenzyl-phosphonic acid | m-Toluidine | 6-Amino-1-naphthol-3,8-disulfonic acid | " | Red |
| 73 | 4-Aminobenzyl-phosphonic acid | o-Anisidine | 6-Amino-1-naphthol-3,8-disulfonic acid | " | " |
| 74 | 4-Aminobenzyl-phosphonic acid | p-Xylidine | 6-Amino-1-naphthol-3,8-disulfonic acid | " | " |
| 75 | 4-Aminobenzyl-phosphonic acid | o-Toluidine | 6-Amino-1-naphthol-3,8-disulfonic acid | " | " |
| 76 | 3-Aminophenyl-phosphonic acid | Cresidine | 8-Amino-1-naphthol-3,5-disulfonic acid | " | Bluish-Red |
| 77 | 3-Aminophenyl-phosphonic acid | Peri Acid | 8-Amino-1-naphthol-3,5-disulfonic acid | " | Blue |
| 78 | 3-Aminophenyl-phosphonic acid | m-Toluidine | 8-Amino-1-naphthol-3,5-disulfonic acid | " | Violet |
| 79 | 3-Aminophenyl-phosphonic acid | o-Anisidine | 8-Amino-1-naphthol-3,5-disulfonic acid | " | Bluish-Red |
| 80 | 3-Aminophenyl-phosphonic acid | 1,6-Cleaves acid | 8-Amino-1-naphthol-3,5-disulfonic acid | " | Blue |
| 81 | 3-Aminophenyl-phosphonic acid | o-Toluidine | 8-Amino-1-naphthol-3,5-disulfonic acid | " | Violet |
| 82 | 3-Aminophenyl-phosphonic acid | Aniline | 8-Amino-1-naphthol-3,5-disulfonic acid | " | Red-Violet |
| 83 | 3-Aminophenyl-phosphonic acid | p-Xylidine | 8-Amino-1-naphthol-3,5-disulfonic acid | " | Blue |
| 84 | 4-Aminobenzyl-phosphonic acid | Peri Acid | 8-Amino-1-naphthol-3,5-disulfonic acid | " | " |
| 85 | 4-Aminobenzyl-phosphonic acid | o-Anisidine | 8-Amino-1-naphthol-3,5-disulfonic acid | " | Bluish-Red |
| 86 | 4-Aminobenzyl-phosphonic acid | p-Xylidine | 8-Amino-1-naphthol-3,5-disulfonic acid | " | Blue |
| 87 | 4-Aminobenzyl-phosphonic acid | 1,6-Cleaves acid | 8-Amino-1-naphthol-3,5-disulfonic acid | " | Blue-Violet |
| 88 | 4-Aminobenzyl-phosphonic acid | Aniline | 8-Amino-1-naphthol-3,5-disulfonic acid | " | Red |
| 89 | 4-Aminobenzyl-phosphonic acid | m-Toluidine | 8-Amino-1-naphthol-3,5-disulfonic acid | " | Violet |
| 90 | 3-Aminophenyl-phosphonic acid | p-Xylidine | 7-Amino-1-naphthol-3,6-disulfonic acid | " | " |
| 91 | 3-Aminophenyl-phosphonic acid | Peri Acid | 7-Amino-1-naphthol-3,6-disulfonic acid | " | Blue-Black |
| 92 | 3-Aminophenyl-phosphonic acid | 1,7-Cleaves acid | 7-Amino-1-naphthol-3,6-disulfonic acid | " | Blue-Black |
| 93 | 3-Aminophenyl-phosphonic acid | p-Xylidine | 7-Amino-1-naphthol-3,6-disulfonic acid | " | Blue |
| 94 | 3-Aminophenyl-phosphonic acid | Aniline | 7-Amino-1-naphthol-3,6-disulfonic acid | " | Red-Violet |
| 95 | 4-Aminophenyl-phosphonic acid | o-Toluidine | 7-Amino-1-naphthol-3,6-disulfonic acid | " | Bluish-Red |
| 96 | 4-Aminophenyl-phosphonic acid | o-Anisidine | 7-Amino-1-naphthol-3,6-disulfonic acid | " | Violet |
| 97 | 4-Aminophenyl-phosphonic acid | 1,6-Cleaves acid | 7-Amino-1-naphthol-3,6-disulfonic acid | " | Blue-Black |
| 98 | 4-Aminobenzyl-phosphonic acid | m-Toluidine | 7-Amino-1-naphthol-3,6-disulfonic acid | " | Bluish-Red |
| 99 | 4-Aminobenzyl-phosphonic acid | Peri Acid | 7-Amino-1-naphthol-3,6-disulfonic acid | " | Blue |
| 100 | 4-Aminobenzyl-phosphonic acid | p-Xylidine | 7-Amino-1-naphthol-3,6-disulfonic acid | " | Violet |
| 101 | 3-Aminophenyl-phosphonic acid | m-Toluidine | 8-Amino-1-naphthol-4,6-disulfonic acid | " | Red |
| 102 | 3-Aminophenyl-phosphonic acid | Aniline | 8-Amino-1-naphthol-4,6-disulfonic acid | " | " |

TABLE B-continued

| EXAMPLE | I | IV | II | III | COLOR |
|---|---|---|---|---|---|
| 103 | 3-Aminophenyl-phosphonic acid | Peri Acid | 8-Amino-1-naphthol-4,6-disulfonic acid | " | Blue |
| 104 | 3-Aminophenyl-phosphonic acid | 1,7-Cleaves acid | 8-Amino-1-naphthol-4,6-disulfonic acid | " | Blue-Violet |
| 105 | 3-Aminophenyl-phosphonic acid | o-Toluidine | 8-Amino-1-naphthol-4,6-disulfonic acid | " | Red |
| 106 | 3-Aminophenyl-phosphonic acid | Cresidine | 8-Amino-1-naphthol-4,6-disulfonic acid | " | Blue |
| 107 | 3-Aminophenyl-phosphonic acid | p-Xylidine | 8-Amino-1-naphthol-4,6-disulfonic acid | " | Violet |
| 108 | 3-Aminophenyl-phosphonic acid | o-Anisidine | 8-Amino-1-naphthol-4,6-disulfonic acid | " | Bluish-Red |
| 109 | 4-Aminobenzyl-phosphonic acid | " | 8-Amino-1-naphthol-4,6-disulfonic acid | " | Bluish-Red |
| 110 | 4-Aminobenzyl-phosphonic acid | Peri Acid | 8-Amino-1-naphthol-4,6-disulfonic acid | " | Blue |
| 111 | 4-Aminobenzyl-phosphonic acid | Cresidine | 8-Amino-1-naphthol-4,6-disulfonic acid | " | Blue-Violet |
| 112 | 4-Aminobenzyl-phosphonic acid | 1,6-Cleaves acid | 8-Amino-1-naphthol-4,6-disulfonic acid | " | Blue |
| 113 | 4-Aminobenzyl-phosphonic acid | m-Toluidine | 8-Amino-1-naphthol-4,6-disulfonic acid | " | Red |
| 114 | 4-Aminobenzyl-phosphonic acid | Aniline | 8-Amino-1-naphthol-4,6-disulfonic acid | " | " |
| 115 | 4-Aminobenzyl-phosphonic acid | o-Anisidine | 8-Amino-1-naphthol-4,6-disulfonic acid | " | " |
| 116 | 3-Aminophenyl-phosphonic acid | " | 1-Amino-8-naphthol-2,4-disulfonic acid | " | Violet |
| 117 | 3-Aminophenyl-phosphonic acid | Peri Acid | 1-Amino-8-naphthol-2,4-disulfonic acid | " | Blue |
| 118 | 3-Aminophenyl-phosphonic acid | o-Anisidine | 1-Amino-8-naphthol-2,4-disulfonic acid | " | Violet |
| 119 | 3-Aminophenyl-phosphonic acid | Aniline | 1-Amino-8-naphthol-2,4-disulfonic acid | " | Bluish-Red |
| 120 | 3-Aminophenyl-phosphonic acid | Cresidine | 1-Amino-8-naphthol-2,4-disulfonic acid | " | Blue |
| 121 | 3-Aminophenyl-phosphonic acid | m-Toluidine | 1-Amino-8-naphthol-2,4-disulfonic acid | " | Violet |
| 122 | 3-Aminophenyl-phosphonic acid | 1,6-Cleaves acid | 1-Amino-8-naphthol-2,4-disulfonic acid | " | Blue-Violet |
| 123 | 3-Aminophenyl-phosphonic acid | p-Xylidine | 1-Amino-8-naphthol-2,4-disulfonic acid | " | Violet |
| 124 | 4-Aminobenzyl-Phosphonic acid | Peri acid | 1-Amino-8-naphthol-2,4-disulfonic acid | " | Blue |
| 125 | 4-Aminobenzyl-Phosphonic acid | m-Toluidine | 1-Amino-8-naphthol-2,4-disulfonic acid | " | Red-Violet |
| 126 | 4-Aminobenzyl-Phosphonic acid | Cresidine | 1-Amino-8-naphthol-2,4-disulfonic acid | " | Blue |
| 127 | 4-Aminobenzyl-phosphonic acid | Aniline | 1-Amino-8-naphthol-2,4-disulfonic acid | " | Bluish-Red |
| 128 | 4-Aminophenyl-phosphonic acid | Peri acid | 1-Amino-8-naphthol-2,4-disulfonic acid | " | Blue |
| 129 | 4-Aminophenyl-phosphonic acid | m-Toluidine | 1-Amino-8-naphthol-2,4-disulfonic acid | " | Violet |
| 130 | 4-Aminophenyl-phosphonic acid | p-Xylidine | 1-Amino-8-naphthol-2,4-disulfonic acid | " | " |

The dyestuffs illustrated by examples 52–130 may be converted to the free acid deacylated form by hydrolysis with hydrochloric acid at pH 0.5-2.0 at 50°-70° C. after completion of coupling, followed by cooling to 0°-20° C. and filtering. The deacylated dyestuffs may be obtained as ammonium salts by neutralizing the coupling after deacylation with ammonia, followed by salting with ammonium chloride and filtration.

It will be appreciated that various modifications may be made in the invention described herein without departing from the scope thereof. It is intended herein that reference to the dyestuffs and formulae refer to both the free acid and salt form. Furthermore, the invention may comprise, consist, or consist essentially of the hereinbefore noted substituents and steps. Hence, the scope of the invention is defined in the following claims wherein:

I claim:

1. An azo dyestuff of the formula:

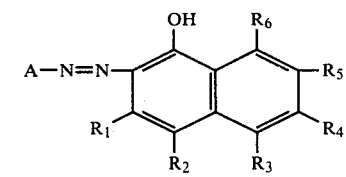

wherein A is a phenylene or naphthalene radical containing at least one phosphonic or phosphoric acid group having the formula:

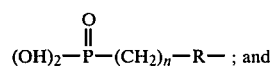

R is a phenyl or naphthyl radical, unsubstituted or substituted;

n is 0 or an integer of 1 to 4;

$R_1$ and $R_2$ are hydrogen or —$SO_3H$; and $R_3$–$R_6$ are hydrogen, —$SO_3H$, or $NR_7Q$ wherein $R_7$ is hydrogen or lower alkyl and Q is hydrogen or an acyl group of 2 to 8 carbon atoms, at least two of $R_1$–$R_6$ being —$SO_3H$ and at least one being —NHQ, provided that when the dyestuff is monazo, then Q is a carbonyl group of 3 to 8 carbons and when the dyestuff is disazo, Q is hydrogen or a carbonyl group of 2 to 8 carbon atoms.

2. An azo dyestuff according to claim 1 wherein A is a phenyl radical including at least one phosphonic acid group; and one of $R_1$–$R_6$ is

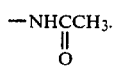

3. A monazo dyestuff according to claim 1 wherein Q is a carbonyl group containing 3 to 8 carbon atoms.

4. An azo dyestuff according to claim 1 wherein A is derived from a diazotized amine selected from the group consisting of
  meta-aminophenyl phosphonic acid;
  para-aminophenyl phosphonic acid;
  meta-aminobenzyl phosphonic acid;
  para-aminobenzyl phosphonic acid;
  2,4,6-tribromo-4-aminophenyl phosphonic acid;
  3-nitro-4-aminophenyl phosphonic acid;
  3-amino-4-chlorophenyl phosphonic acid;
  3-amino-4-methylphenyl phosphonic acid;
  3-amino-4-phenoxyphenyl phosphonic acid;
  3-amino-4-hydroxyphenyl phosphonic acid;
  3-amino-4-orthochlorophenoxyphenyl phosphonic acid;
  3-amino-4-bromophenyl phosphonic acid;
  3-amino-4-methoxyphenyl phosphonic acid;
  3-amino-4-methylphenyl phosphonic acid;
  2-hydroxy-5-aminobenzyl phosphonic acid;
  4-amino-1-naphthyl phosphonic acid;
  4-amino-8-methyl-1-naphthyl phosphonic acid; and
  4-amino-3-chloro-1-naphthyl phosphonic acid.

5. An azo dyestuff according to claim 1 wherein A is derived from a diazotized amine selected from the group consisting of
  meta-aminophenyl phosphoric acid;
  para-aminophenyl phosphoric acid;
  meta-aminobenzyl phosphoric acid;
  para-aminobenzyl phosphoric acid;
  2,4,6-tribromo-4-aminophenyl phosphoric acid;
  3-nitro-4-aminophenyl phosphoric acid;
  3-amino-4-chlorophenyl phosphoric acid;
  3-amino-4-methylphenyl phosphoric acid;
  3-amino-4-phenoxyphenyl phosphoric acid;
  3-amino-4-hydroxyphenyl phosphoric acid;
  3-amino-4-orthochlorophenoxyphenyl phosphoric acid;
  3-amino-4-bromophenyl phosphoric acid;
  3-amino-4-methoxyphenyl phosphoric acid;
  3-amino-4-methylphenyl phosphoric acid;
  2-hydroxy-5-aminobenzyl phosphoric acid;
  4-amino-1-naphthyl phosphoric acid;
  4-amino-8-methyl-1-naphthyl phosphoric acid; and
  4-amino-3-chloro-1-naphthyl phosphoric acid.

6. An azo dyestuff according to claim 1 wherein A is derived from a diazotized amine selected from the group consisting of:

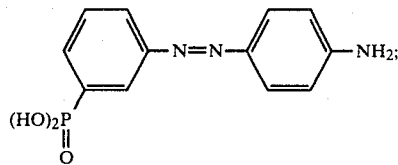

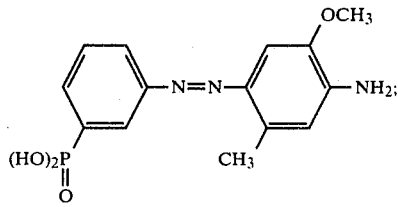

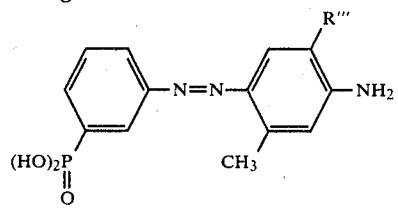

where R''' is hydrogen or methyl;

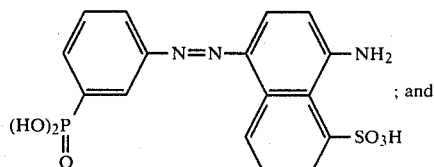

; and

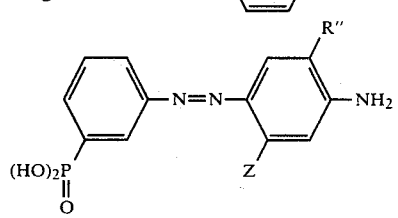

where Z = H or $CH_3$
R'' = $OCH_3$, $CH_3$ or H.

7. An azo dyestuff according to claim 1, wherein A has the formula:

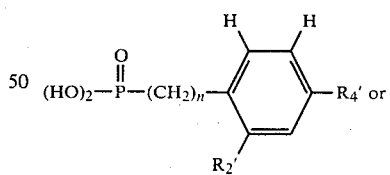

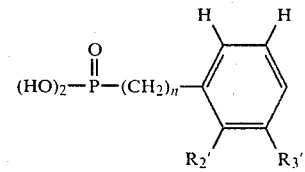

wherein:
n is as defined in claim 17;
$R_2'$ is hydrogen or halogen;
$R_3'$ is hydrogen or nitro; and
$R_4'$ is hydrogen, halogen, lower alkyl of 1 to 4 carbons, methoxy, phenoxy or R'—NH— where R' is alkyl of 1 to 4 carbon atoms, or hydroxy alkyl of 1 to 4 carbon atoms having a terminal sulfonic acid group.

8. A disazo dyestuff according to claim 1 wherein A is phenylazonaphthalene or azobenzene and Q is hydrogen or a carbonyl group containing from 2 to 8 carbon atoms.

9. A dyestuff according to claim 1 having the formula:

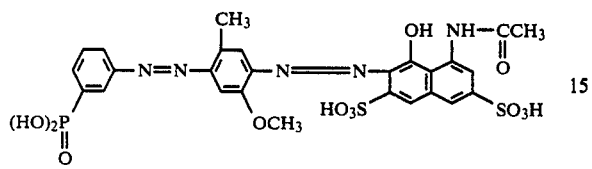

10. A dyestuff according to claim 9 having the formula:

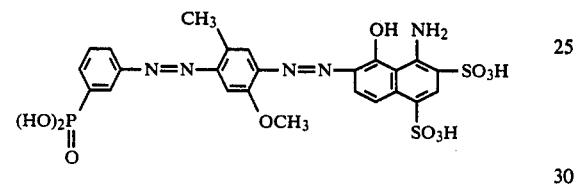

11. A dyestuff according to claim 9 having the formula:

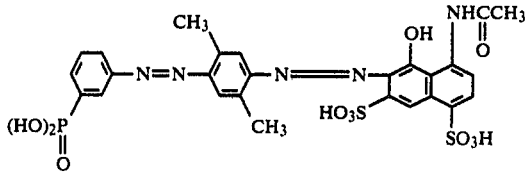

12. A dyestuff according to claim 1 having the formula:

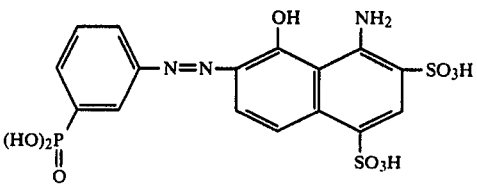

13. A dyestuff according to claim 1 having the formula:

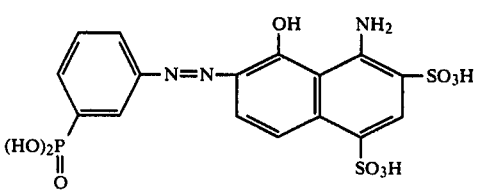

* * * * *

UNITED STATES PATENT AND TRADEMARK OFFICE
CERTIFICATE OF CORRECTION

PATENT NO. : 4,230,618
DATED : October 28, 1980
INVENTOR(S) : Donald R. Gauthier It is certified that error appears in the above–identified patent and that said Letters Patent are hereby corrected as shown below:

Column 3, delete line 18.

Column 16, line 63 delete "claim 17" insert -- claim 1 --

Column 17, line 8 delete "claim 1" insert -- claim 8 --

Column 17, line 20 delete "claim 9" insert -- claim 8 --

Column 17, line 32 delete "claim 9" insert -- claim 8 --

*Signed and Sealed this*

*Twenty-third* Day of *June 1981*

[SEAL]

*Attest:*

RENE D. TEGTMEYER

*Attesting Officer*     *Acting Commissioner of Patents and Trademarks*